United States Patent [19]

Momata et al.

[11] Patent Number: 4,860,140

[45] Date of Patent: Aug. 22, 1989

[54] MAGNETIC HEAD CLOSURE HAVING FERRITE SUBSTRATE AND CLOSURE AND CONDUCTIVE THIN FILM COIL DEPOSITED IN RECESS OF SUBSTANTIALLY SAME SHAPE IN FERRITE SUBSTRATE

[75] Inventors: Kazuhiro Momata, Chigasaki; Kousaku Chida, Odawara; Tooru Takeura, Odawara; Yukihisa Tsukada, Odawara, all of Japan

[73] Assignee: Hitachi, Ltd., Tokyo, Japan

[21] Appl. No.: 183,338

[22] Filed: Apr. 7, 1988

Related U.S. Application Data

[63] Continuation of Ser. No. 911,001, Sep. 24, 1986.

[30] Foreign Application Priority Data

Sep. 25, 1985 [JP] Japan .................................. 60-210065

[51] Int. Cl.$^4$ ...................... G11B 5/133; G11B 5/147; G11B 5/17; G11B 5/193
[52] U.S. Cl. .................................. 360/127; 360/119; 360/123; 360/126
[58] Field of Search ............... 360/119, 120, 123, 125, 360/126, 127

[56] References Cited

U.S. PATENT DOCUMENTS 3,766,640 10/1973 Hahn ................................. 360/123
4,217,613 8/1980 Schwartz ........................... 360/119
4,375,657 3/1983 Brock et al. ....................... 360/119

Primary Examiner—Robert S. Tupper
Attorney, Agent, or Firm—Antonelli, Terry & Wands

[57] ABSTRACT

The magnetic head according to the present invention has a ferrite substrate and closure. The ferrite substrate has formed therein a first recess in which a conductive coil is to be deposited, while the ferrite closure has formed therein a second recess enclosing a portion of the conductive coil that is contributed to at least signal transducing. The end of the second recess is disposed in a position related with the depth of the tranducing gap. Since the first recess in which the conductive coil is deposited has no influence on the magnetic transducing efficiency, it can be much freely formed by photolithography or reactive ion etching. Also since the second recess having an influence on the magnetic transducing efficiency can be formed by precision machining, no advanced process control is needed.

14 Claims, 3 Drawing Sheets

MAGNETIC HEAD CLOSURE HAVING FERRITE SUBSTRATE AND CLOSURE AND CONDUCTIVE THIN FILM COIL DEPOSITED IN RECESS OF SUBSTANTIALLY SAME SHAPE IN FERRITE SUBSTRATE

This application is a continuation of application Ser. No. 911,001, filed Sept. 24, 1986.

BACKGROUND OF THE INVENTION (a) Field of the Invention:

The present invention relates to magnetic head having a ferrite pole pieces and thin film coils.

(b) Related art statement:

Most of the conventional magnetic heads using the ferrite core are of a structure in which a wire is wound on a ferrite core piece.

Recently, however, the magnetic head core and coil have been designed increasingly compact because increased write/read efficiency of the magnetic head and smaller width of magnetic head track are required to meet the requirements for high recording density and track density. In these circumstances, the conventional types of magnetic head with the wire wound on the ferrite core piece cannot meet such requirements.

To meet the above-mentioned requirements, various proposals have been made. One of such proposals is disclosed, for example, in the Japanese Unexamined Patent Publication (Kokai) No. 57-78615 (corresponding in U.S. Pat. No. 4,375,657 issued on Mar. 1, 1983).

A magnetic head of such type is shown in FIGS. 1 and 2.

As shown in FIG. 1, the magnetic head has a ferrite substrate 10 and ferrite closure 12. The ferrite substrate 10 is recessed at 14 by photolithography or reactive ion etching. The surface of the ferrite substrate 10 including this recess 14 is covered with a thin film insulative layer 20 of aluminum oxide, and the insulative layer 20 within the recess 14 has formed thereon a coil 16 having two narrow sections 18a and 18b and a wide section 18. The ferrite closure 12 is bonded to the ferrite substrate 10 and these form together a single magnetic head 10. Also, as shown in FIG. 2, the ferrite substrate 10 has provided around it glass layers 30 and 32 which prevent any cross-talk between successive head elements and also define the track width. A recording medium is indicated at 26.

In the above-mentioned conventional techniques, head dissipation $I^2R$ due to the flow of a recording current I can be limited by increasing the section area of the conductive coil 16 and reducing the electrical resistance R. Also, the conventional technique is advantageous in that a magnetic head of high write/read efficiency can be provided by disposing the conductive coil 16 sufficiently near the magnetic transducing gap 21. On the other hand, since the apex angle near the transducing gap 21, namely, an angle $\theta$ formed by the inner surface extending from the upper end of the recess 14 with respect to the direction of depth of the transducing gap 21, has a large influence on the transducing efficiency of the magnetic head, the angle $\theta$ must be maintained an optimal one with which the transducing efficiency of the magnetic head can be maximized, when the recess 14 where the conductive coil 16 is disposed is formed. In the actual production of the magnetic head of such type, a number of ferrite substrates 10 are produced from a single wafer, and the recess 14 for each of the ferrite substrates 10 is formed by photolithography or reactive ion etching under the same conditions before the wafer is cut into the ferrite substrates 10. So, the nonuniformity of the angle $\theta$ is small within a same lot of the production. However, to form the recess 14 in such a manner as to maintain the angle $\theta$ constant among the plural lots of ferrite-substrate production and for uniform performance of the magnetic heads thus massively produced, highly advanced technology and process control are required along with the photolithography and reactive ion etching.

SUMMARY OF THE INVENTION

The present invention seeks to provide a magnetic head which has no above-mentioned drawbacks of the conventional magnectic heads.

The present invention also seeks to provide a magnetic head of which the transducing efficiency can be maintained constant and also in which the Joule heating can be limited, and which can be produced without any highly advanced technology and process control.

The above objects can be accomplished according to the present invention by providing a magnetic head in which a ferrite substrate has formed therein a first recess in which a conductive coil is deposited while a second recess defining a transducing gap and having an influence on the magnetic transducing efficiency is formed in a ferrite closure, said first recess being formed somewhat freely by photolithography or reactive ion etching while said second recess is accurately finished by precision machining.

DESCRIPTION OF THE PREFERRED EMBODIMENTS

Figure 1:
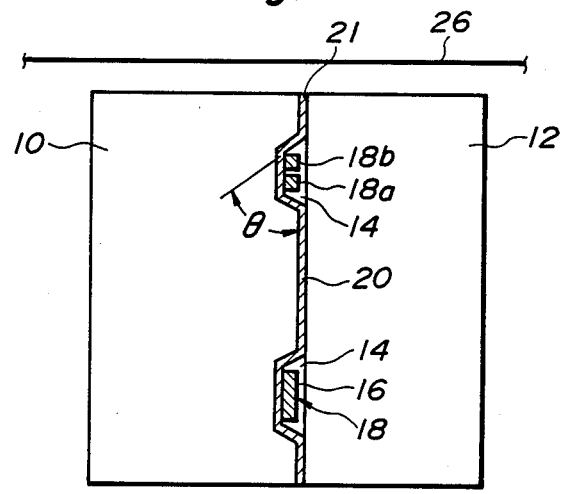
FIG. 1 is a sectional view of a conventional magnetic head.
Figure 2:
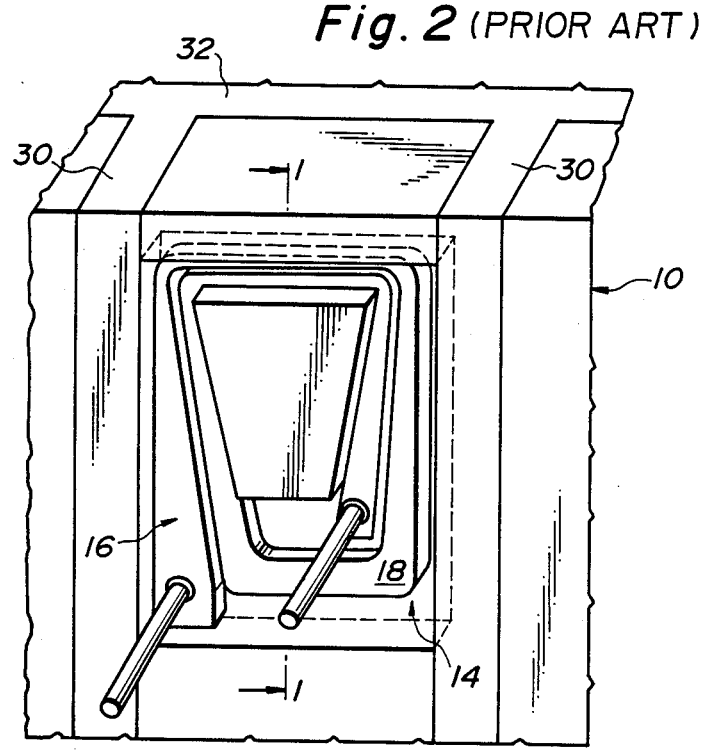
FIG. 2 is a schematic perspective view showing the ferrite substrate of the magnetic head shown in FIG. 1.
Figure 3:
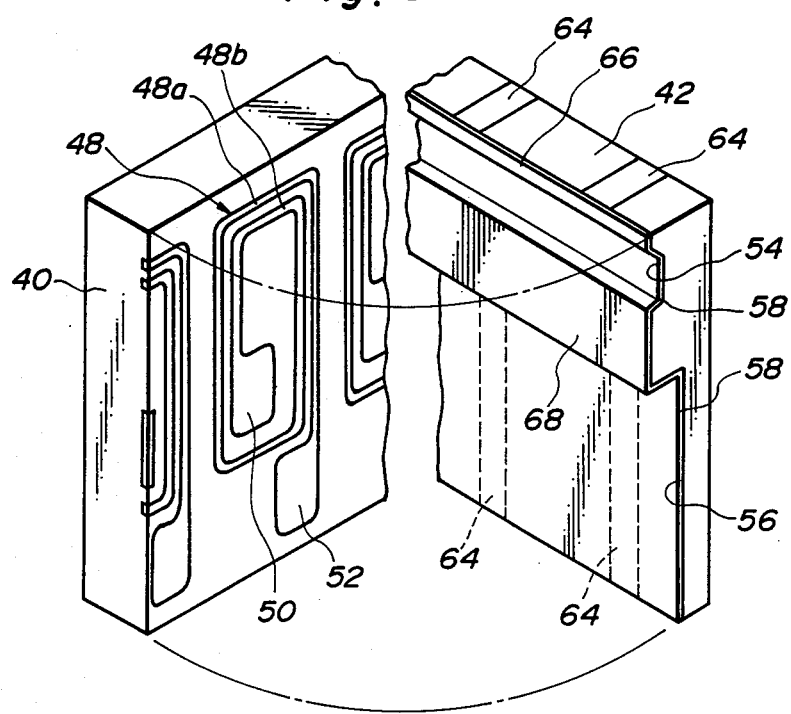
FIG. 3 shows one embodiment of the magnetic head according to the present invention, the ferrite substrate and closure being perspectively shown in the state before they are bonded to each other.

The magnetic disk according to the present invention has a ferrite substrate 40 and ferrite closure 42 as shown in FIG. 3.

Figure 4:
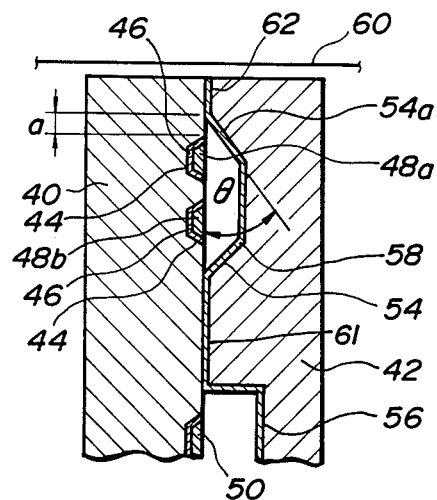
FIG. 4 is an axial sectional view of the magnetic head shown in FIG. 3, with the ferrite substrate and closure being bonded together.

The ferrite substrate 40 is made of a ferrite of Mn-Zn with a relatively low electrical resistivity or Ni-Zn with a relatively high electrical resistivity. The ferrite substrate 40 has formed in the surface thereof recesses 44 which have a generally V-shaped sectional form as shown in FIG. 4. These recesses 44 have formed therein a conductive coil 48 with an insulative layer 46 thereunder by using a thin film technology as will be described later, and their form is substantially the same as the conductive coil 48 disposed therein. In case the ferrite substrate 40 is made of a ferrite having a relatively large resistivity such as Ni-Zn, the insulative layer 46 is unnecessary; however, it is required if the ferrite substrate 40 is made of a ferrite with a relatively high electrical resistivity such as a Mn-Zn ferrite, and in this case, it is made of an insulator such as $Al_2O_3$ or $SiO_2$ to isolate the conductive coil 48 from the ferrite substrate 40.

The conductive coil 48 is formed on the ferrite substrate 40 or directly on the insulative layer 46 by sputtering, plating or vacuum deposition of a good conductor such as Al, Cu, Au, Ag, etc. The conductive coil 48 consists of two sections 48a and 48b contributing to the signal transducing, and also two pads 50 and 52 which are wider than the sections 48a and 48b. These pads 50 and 52 are so designed as to be connected through wires (not shown) to a magnetic head drive circuit (not shown).

The ferrite closure 42 is made of a ferrite of Mn-Zn or Ni-Zn as used in producing the ferrite substrate 40. The ferrite closure 42 has formed in the surface thereof a second recess 54 of generally V-shaped sectional form. The recess 54 has such a form as to enclose one portion, namely, the sections 48a and 48b, of the conductive coil 48 disposed in the ferrite substrate 40. The ferrite closure 42 has also formed, on the surface thereof at the same side as where the recess 54 is formed, an undercut 56 for the wires which connect the pads 50 and 52 on the ferrite substrate 40 to the magnetic head drive circuit. As shown in FIGS. 3 and 4, the surface of the ferrite closure 42 at the side where the recess 54 and undercut 56 are formed has formed wholly thereon an insulative layer 58 made of an insulator such as $Al_2O_3$ or $SiO_2$. This insulative layer 58 defines a transducing gap 62 which transduces a signal with respect to a recording medium 60 closely adjoining the effective transducing surface of the magnetic head. That is, the thickness of the insulative layer 58 corresponds to the length of the transducing gap 62 (gap length), while the distance from the transducing surface to the end of the recess 54 corresponds to the depth of the transducing gap 62. The reference numeral 64 indicates a glass layer which isolates the successive head elements from each other to prevent any cross-talk between them and also defines the width of one data track.

The existence of the second recess 54 having been described previously is important in the present invention. The angle of the inclined surface 54a of the recess 54 with respect to the direction of depth of the transducing gap 62 is made an appropriate one to provide an appropriate magnetic resistance in order to make an influence on the magnetic transducing efficiency. And the portion of the recess 54 where the inclined surface 54a intersects the direction of depth of the transducing gap 62, that is to say, the upper end of the recess 54, is disposed as displaced toward the transducing surface a distance a from the end of the conductive coil 48a disposed inside the recess 44 in the ferrite substrate 40, and the lower end of the recess 54 is also disposed as displaced downward a predetermined distance from the end of the conductive coil 48b.

The insulative layer 62 as gap material is formed on a flat surface 66 extending upward from the upper end of the recess 54, and also another insulative layer 61 is formed on a flat surface 68 extending downward from the lower end of the recess 54, these surfaces of the ferrite closure 42 including these insulative layers 62 being bonded to the surface of the ferrite substrate 40 with epoxy resin or the like.

Here, one example of the magnetic head according to the embodiment having been described in the foregoing will be explained.

First, the surface of the ferrite substrate 40 of Mn-Zn is lapped, and has formed therein the first recess 44 of generally the same shape as that of the conductive coil 48 by photolithography, reactive ion milling or ion milling.

Next, the insulative layer 46 is deposited on the entire surface of the ferrite substrate 40 where the conductive coil 48 is to be formed. Then, a good conductor is deposited to a thickness larger than the depth of the first recess 44 everywhere on the flat and recessed portions by plating, deposition or sputtering. Further, the surface of the ferrite substrate 40 which is to be fitted to the ferrite closure 42, namely, the surface on which the good conductor is deposited is lapped flat. This lapping is done until the outer contour of the first recesses 44, that is, the surface of the ferrite substrate 40 is exposed. Thus, the good conductor will remain only in the first recesses 44, which forms the conductive coil 48. Also, the lapping will eliminate any curvature, of the surface of the ferrite substrate which is to be fitted to the ferrite closure 42, that has been caused by the stress, etc. developed in the preceding process, and thus provide a flat surface.

On the other hand, the ferrite closure 42 is formed by making integral with each other a ferrite material of Mn-Zn and a glass layer 64, and cutting this composite material of the ferrite material and glass layer 64 to a thickness for a desired track width of the magnetic head. Next, the surface of the ferrite closure 42 which is to be fitted to the ferrite substrate 40 is finished by lapping. The lapped surface of the ferrite crosure 42 has formed therein near the magnetic transducing gap 62 a second recess 54 having an inclined surface 54a of an angle $\theta$ with respect to the direction of depth of the transducing gap 62, and also an undercut 56, namely, a third recess, is formed in the above-mentioned surface of the ferrite closure 42 and in a position facing the pads 50 and 52 on the ferrite substrate 40. This undercut is provided for connection of the wires to the pads. These second and third recesses are to be formed by machining which permits simple formation with a high precision of the second recess 54 that has the angle $\theta$ influencing the magnetic transducing efficiency among others. Further, the insulative layer 58 of $Al_2O_3$ or $SiO_2$ which defines the length and depth of the magnetic transducing gap 62 is deposited on the surface of the ferrite closure 42 which is to be fitted to the ferrite substrate 40 and also includes the second and third recesses 54 and 56.

Then, the ferrite substrate 40 and closure 42 are bonded to each other using an epoxy resin or the like, thereby completing the magnetic head.

By the foregoing method of production, it is possible to freely set the thickness of the conductive coil 48 in the production of magnetic heads since the first recess 44 may be formed to a somewhat freely selected depth in the ferrite substrate 40.

Further, the second recess 54 and third recess or undercut 56 for the wires connected to the pads can be simply formed in the ferrite closure 42 by machining. More particularly, the recess 54 can be formed simply with a high precision by machining for the inclined surface thereof to have an optimal angle $\theta$ which has an influence on the magnetic head efficiency.

Also in the process where the ferrite substrate 40 and closure 42 are bonded to each other, their fitting surfaces can be finished by lapping so as to eliminate the curving of the ferrite substrate 40 due to the stress or the like developed in the manufacturing process, so that no clearance develops between the fitting surfaces of the substrate and closure members and these members can be simply registered to each other. Thus, magnetic heads of high quality can be produced.

According to this embodiment, the thickness of the conductive coil 48 can be freely set by changing the depth of the first recess 44 for accomodation of the conductive coil. Therefore, by forming the first recess 44 to a sufficient depth and the conductive coil 48 to a sufficient thickness, it is possible to limit the Joule heating caused by supply of a recording current through the conductive coil 48; so, the first recess 44 and conductive coil 48 can be formed without any highly advanced technique and process control.

Figure 5:
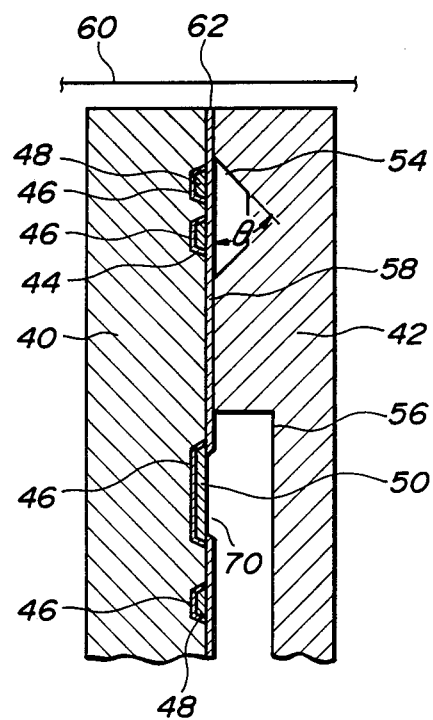
FIG. 5 is also an axial sectional view of another embodiment of the magnetic head according to the present invention.

FIG. 5 shows a second embodiment of the magnetic head according to the present invention.

In the embodiment of magnetic head shown in FIG. 5, the insulative layer 58 defining the length and depth of the magnetic transducing gap 62 is deposited on the front face of the ferrite substrate 40. For the pads 50 and 52 connected to the conductive coil 48, an exposed conductor 50 is provided for connection to the wires connecting the conductor coil 48 and the magnetic head drive circuit to each other.

In the second embodiment shown in FIG. 5, the conductive coil 48 formed in the ferrite substrate 40 is covered with and retained by the insulative layer 58, whereby it is possible to prevent any trouble that when connecting, by soldering or any other method, the wires connected to the magnetic head drive circuit to the pads 50 and 52, these pads 50 and 52 will be separated from the ferrite substrate 40 due to a thermal stress.

Note that any other configuration and function of the embodiment shown in FIG. 5 are similar to those of the embodiment shown in FIGS. 3 and 4. So, they will not be described any further here.

According to the present invention, the glass layer 64 on the ferrite closure 42 in the foregoing embodiments may be provided instead on the ferrite substrate 40, and also the glass layer 64 may be omitted.

What is claimed is:

1. A magnetic head having a transducing surface, comprising:
    a ferrite substrate having a first recess formed in a predetermined surface thereof;
    a ferrite closure having a second recess fitted to said predetermined surface of said ferrite substrate;
    an insulative layer deposited on a surface of said ferrite closure, including said second recess, which surface faces said predetermined surface of said ferrite substrate, at least a portion of said insulative layer adjacent said transducing surface forming a transducing gap; and
    a conductive thin film coil deposited in said first recess in a substantially same shape as said first recess;
    wherein said second recess is formed in a surface of said ferrite closure so as to enclose a portion of said conductive thin film coil adjacent said transducing gap, wherein said second recess has first and second inclined surfaces, an edge of said first inclined surface nearest said transducing gap being disposed in such a position as to define a depth of said transducing gap, and an edge of said second inclined surface being disposed away from said transducing surface a predetermined distance from said portion of said conductive thin film adjacent said transducing gap.

2. A magnetic head according to claim 1, wherein said first and second inclined surfaces oppose one another so as to have a generally V-shaped sectional form.

3. A magnetic head according to claim 1, wherein said first inclined surface forms an angle of less than 90° with said predetermined surface of said ferrite substrate.

4. A magnetic head according to claim 1, wherein said ferrite substrate is made of a ferrite material having relatively low electrical resistance, and another insulative layer is deposited between said first recess and conductive coil.

5. A magnetic head having a transducing surface, comprising:
    a ferrite substrate having a first recess formed in a predetermined surface thereof;
    a ferrite closure fitted to said predetermined surface of said ferrite substrate;
    a conductive thin film coil deposited in said first recess in a substantially same shape as said first recess;
    an insulative layer deposited on said ferrite substrate and covering said conductive thin film coil, at least a portion of said insulative layer adjacent said transducing surface forming a transducing gap; and
    a second recess formed in a surface of said ferrite closure so as to enclose a portion of said conductive thin film coil adjacent said transducing gap, wherein said second recess has first and second inclined surfaces, an edge of said first inclined surface nearest said transducing gap being disposed in such a position as to define a depth of said transducing gap, and an edge of said second inclined surface being disposed away from said transducing surface a predetermined distance from said portion of said conductive thin film adjacent said transducing gap.

6. A magnetic head according to claim 5, wherein said first and second inclined surfaces oppose one another so as to have a generally V-shaped sectional form.

7. A magnetic head according to claim 5, wherein said first inclined surface forms an angle of less than 90° with said predetermined surface of said ferrite substrate.

8. A magnetic head according to claim 5, wherein said ferrite substrate is made of a ferrite material having relatively low electrical resistance, and another insulative layer is deposited between said first recess and conductive coil.

9. A magnetic head having a transducing surface, comprising:
    a ferrite substrate having a first recess formed in a predetermined surface thereof;
    a ferrite closure fitted to said predetermined surface of said ferrite substrate;
    an insulative layer provided on said predetermined surface of said ferrite substrate or on said ferrite closure, at least a portion of said insulative layer adjacent said transducing surface forming a transducing gap;
    a conductive thin film coil deposited in said first recess in a substantially same shape as said first recess; and
    a second recess formed in a surface of said ferrite closure so as to enclose a portion of said conductive thin film coil adjacent said transducing gap, wherein said second recess has first and second inclined surfaces, an edge of said first inclined surface nearest said transducing gap being disposed in such a position as to define a depth of said transducing gap, and an edge of said second inclined surface being disposed away from said transducing surface a predetermined distance from said portion of said conductive thin film adjacent said transducing gap.

10. A magnetic head according to claim 9, wherein said ferrite substrate is made of a ferrite material having relatively low electrical resistance, and another insulative layer is deposited between said first recess and conductive thin film coil.

11. A magnetic head according to claim 9, wherein said edge of said first inclined surface is displaced toward said transducing surface a predetermined distance from said portion of said conductive thin film coil contributing to signal transducing.

12. A magnetic head according to claim 9, wherein said first and second inclined surfaces oppose one another so as to have a generally V-shaped sectional form.

13. A magnetic head according to claim 9, wherein said insulative layer is provided between said ferrite substrate and said ferrite closure such that a portion of said insulative layer adjacent said transducing surface forms said transducing gap between said ferrite substrate and said ferrite closure.

14. A magnetic head according to claim 9, wherein said first inclined surface forms an angle of less than 90° with said predetermined surface of said ferrite substrate.

* * * * *